Dec. 16, 1958 W. O. FORRER 2,864,932
INFRARED COOKING OVEN
Filed Aug. 19, 1954
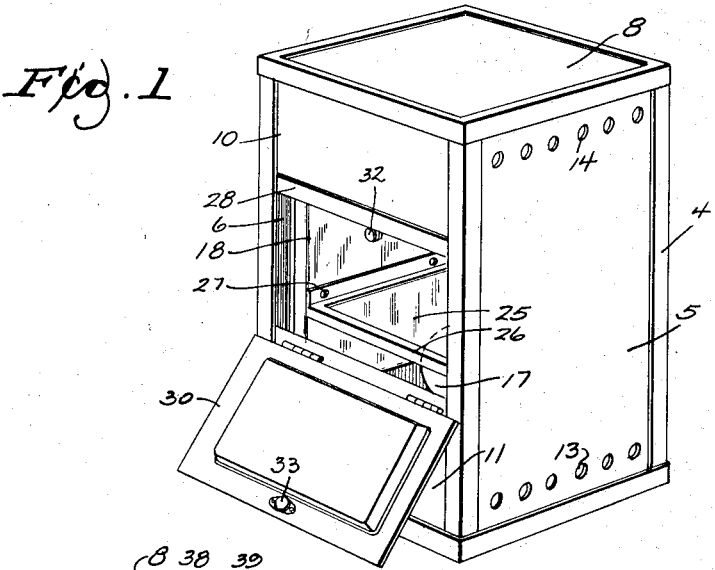
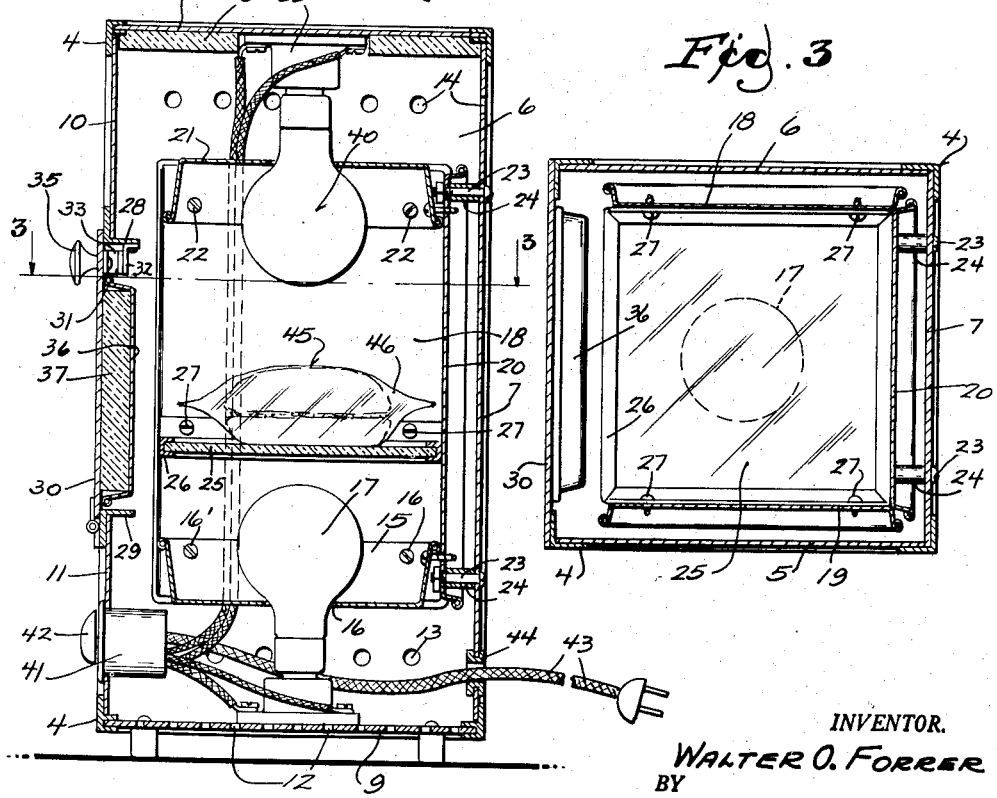
INVENTOR.
WALTER O. FORRER
BY
Wheeler, Wheeler & Wheeler
ATTORNEYS

United States Patent Office 2,864,932
Patented Dec. 16, 1958

2,864,932

INFRARED COOKING OVEN

Walter O. Forrer, Milwaukee, Wis.

Application August 19, 1954, Serial No. 450,842

9 Claims. (Cl. 219—35)

This invention relates to an infrared cooking oven and method of cooking.

The food to be cooked is desirably, although not necessarily, completely wrapped and even sealed in any of the transparent wrapping films in common use, cellophane being preferred. It is placed on a support desirably comprising Pyrex glass above at least one source of infrared energy and below another. In practice, infrared heating lamps are used. The lamps are turned on and the door of the oven is closed, leaving the food nearly completely surrounded by reflecting surfaces but exposed for completely free circulation of air, not only about the reflecting surfaces but through the chamber in which the food is confined. Within a few minutes the food will be cooked and ready for delivery at high temperature from the oven, notwithstanding that the heat will have penetrated the cellophane wrapper with no damage whatever to the wrapper and without appreciably increasing its temperature. Accordingly the operator may reach with his unprotected hand into the oven to remove the food, although he may find that the food feels uncomfortably hot through the wrapper if he grasps the wrapper too tightly.

All juices are found to be confined not merely within the wrapper but within the food, whereby flavor is enhanced. Moreover, the food is cooked substantially uniformly at all points from the center to the outside. Yet these results are achieved without any scorching of the food or the wrapper, due in part to the use of glass as a support for the food and in part to the arrangement of the lamps and reflectors and in part to the free circulation of air which carries off heat from the reflectors and the supporting shelf and from the wrapper while still permitting the food to be cooked by radiation from the lamps. The outside shell of the oven never gets objectionably warm, a feature of the invention being the fact that the inner reflecting shell constitutes a unit which is supported from the outside shell only at a few isolated points of connection to the rear wall of the oven.

In the drawings:

Fig. 1 is a view in perspective of an oven embodying the invention as it appears with its door open.

Fig. 2 is a view on an enlarged scale taken through the oven in transverse vertical section.

Fig. 3 is a view taken in section on the line 3—3 of Fig. 2.

The outer shell of the oven comprises a frame 4 to which are connected the side panels 5 and 6, a rear panel 7, a top panel 8, bottom panel 9 and upper and lower front panels 10 and 11. The bottom panel 9 may be made of fiber, although this is not essential. Throughout its area it is punched full of small holes at 12. All other panels are, in practice, made of aluminum sheet. The side and rear panels 5, 6, and 7 have rows of holes at 13 near the bottom of the oven and rows of holes at 14 near the top.

Within the oven there is a chamber having reflecting walls, all of which desirably comprises pan shaped elements. The bottom comprises a pan 15 apertured at 16 to pass the neck of the heat lamp 17. The pan 15 is a relatively deep pan secured by sheet metal screws 16' to the lateral pan 18, the lateral pan 19 and the rear wall pan 20. Pans 18, 19 and 20 are relatively more shallow and have their side flanges facing outwardly, as clearly shown in Fig. 3.

The top pan 21 is similar to the pan 15 but used in an inverted position and connected by screws 22 with the side pans 18 and 19 and the rear wall pan 20.

Between the upper and lower pans 21 and 15 is a Pyrex glass shelf 25 which may comprise simply a glass plate instead of being dished. In any event, it is enclosed in a metallic frame 26 connected by screws 27 with the side pans 18 and 19.

The inwardly facing surfaces of the several pans 15, 18, 19, 20 and 21 are desirably not only highly reflective but may have an integrally embossed pattern of ribs and grooves tending to diffuse radiation reflected therefrom. The reflecting chamber thus formed is completely open to the front and no attempt is made to fit the pans together tightly, it being desirable to permit free circulation of air around food which is being cooked while supported on the Pyrex glass shelf at 25.

The unitarily pre-fabricated inner housing comprising the pan shaped side and rear walls and top and bottom walls connected as above described is mounted from the external shell. Desirably the mounting means is confined entirely to the rear. I use upper and lower pairs of bolts 23 which extend through the rear wall 7 and the tubular spacing sleeves 24 and the rear pan 20 of the inner housing, as clearly shown in Figs. 2 and 3.

The oven frame 4 comprises upper and lower door jamb angles at 28 and 29, to one of which the door 30 is hinged. I have found it desirable to use a magnetic catch at 31 which includes an armature supported by bracket 32 from the angle 28, the door being provided with a magnet at 33 which engages the armature in the closed position of the door. A handle 35 facilitates manipulation of the door.

The door has a reflecting pan applied at 36 to its inner face and there may be insulation at 37 of glass fiber or the like to assist in keeping the door 30 as cool as possible. The inner face of the pan 36 reflects the radiation back toward the material which is being cooked.

The only other place in the oven at which I have found it expedient to use insulation is on the under surface of the top wall 8 where I employ a bat of insulation at 38 around the socket 39 for the upper heat lamp 40.

The two lamps are served in parallel through a conventional timer 41 having a time setting switch handle at 42 and supplied with current by a cord 43 entering the oven through a grommet 44 in its rear wall.

At 45 I have shown a sandwich sealed in a cellophane wrapper 46 and resting on the Pyrex shelf 25 in a position between the upper heat lamp 40 and the lower heat lamp 17. It has been found desirable for the shelf 25 to be only about an inch above the infra-red lamp 17 and much closer to that lamp than to the infra-red lamp 40. This takes account of the fact that some heat energy is lost in transmission through the shelf 25. The greater proximity of the food to the lamp 17 permits the food to receive approximately equal radiation from the two sources. A Pyrex glass shelf has been found to be infinitely superior to a metal grill or the like as a means of supporting the food. While the shelf absorbs some heat, it does not absorb nearly as much as it would if it were completely opaque. In consequence of the fact that the shelf is largely transparent to the infra-red radiation and because of the further fact that it is constantly exposed to circulating air, the oven may be in substantially continuous use without the shelf becoming so heated that it will cause scorch marks to appear upon the food. Unlike any other oven known to me, this oven may be in continuous operation with the door closed for a period of hours without becoming heated to a temperature in excess of about 400° F. In actual operation, with the door being repeatedly opened, the temperatures are ordinarily considerably below this figure. Air circulates through it with sufficient rapidity so that the air within the over is never too hot to preclude the use of the operator's hand in placing and removing the food. This circulating air further carries away the heat from the inner reflecting chamber walls and protects the outer shell from having any dangerous rise in temperature.

While my method has been made clear in the foregoing description of the oven, it will be summarized briefly:

Food to be cooked is exposed from opposite sides to infra-red radiation which is desirably of substantially equal cooking intensity from the opposing sources. While so exposed infra-red radition, the food is surrounded by an ambient atmosphere which is in sufficiently rapid circulation so that the atmosphere as such is not at food cooking temperatures. Yet the food is protected from dehydration by the rapidly circulating ambient atmosphere by reason of the fact that it is desirably completely enclosed and sealed within a heat transparent protective wrapper.

Thus the food cooked substantially exclusively by infra-red radiation without loss of moisture or natural juice content and, in the preferred practice of the invention, is cooked substantially uniformly throughout all portions of the food.

I am aware of the fact that food has been subjected to infra-red radiation for a variety of purposes, including cooking. I am also aware of the fact that wrapped food has been subjected momentarily to infra-red radiation, but under circumstances such that cooking was avoided and only the surfaces of the food was heated. The method herein described uses the wrapper to protect the uncooked food during its commercial distribution; to confine the vapor and aroma of the food during cooking; and to protect the operator's hands from being burned by the hot food when the food is removed from the oven. The wrapper is left relatively loose about the food for these purposes and the food is thoroughly cooked from the center out while wrapped.

The bulbs used in practice are 500 watt infra-red bulbs delivering at peak performance about 12,000 angstrom units. The useful range is believed to be 4000 to 30,000 angstrom units.

I claim:

1. An oven for cooking food wrapped in infra-red-transparent wrappers comprising an external shell and an internal housing spaced from the shell, said internal housing having reflector surfaces and being provided with spaced sources of infra-red radiation and with an intervening shelf on which wrapped food is deposited, the external shell having openings of substantial aggregate area adjacent its top and bottom and in communication with the space between the shell and housing, the interior of said housing also communicating with said space whereby to afford free air circulation throughout said shell, whereby wrapped food on said shelf will be heated primarily by radiation from said sources substantially independently of heat from air within said housing.

2. The device of claim 1 in which said housing comprises pan shaped top, bottom, side and rear walls in unitary connection and means including spacers for supporting the unitary housing from said shell.

3. The device of claim 2 in which said shelf comprises Pyrex glass having a marginal metal panel connected internally to said housing.

4. An infra-red oven comprising the combination with a Pyrex glass shelf of upper and lower infra-red bulbs spaced above and below the shelf, the shelf being closer to the lower bulb than to the upper, shelf supporting means laterally offset from said bulbs, and an external shell spaced from said shelf-supporting means and provided with upper and lower openings for air circulation for accommodating free air movement about said means and shelf, the combined effect of the transparency of said shelf to infra-red radiation and the cooling of said shelf by the air being such as to be adapted to maintain said shelf at a temperature below that which would scorch material placed on the shelf.

5. The device of claim 4 in which said housing is provided with a door having a reflective inner surface and affording access to the shelf at a point between the laterally spaced supporting means therefor and timing means in series with said lamps for controlling the duration of their operation.

6. The device of claim 4 in which the supporting means for the shelf comprises a housing having an opening opposite said door and having side and rear walls of high infra-red reflectivity, said housing having means supporting it in spaced relation to said shell at a point remote from said door.

7. An infra-red oven comprising the combination with a Pyrex glass shelf, of upper and lower infra-red bulbs spaced above and below the shelf, the shelf being closer to the lower bulb than to the upper, shelf-supporting means laterally offset from said bulbs and comprising a housing having a door affording access to the shelf at a point between the laterally spaced supporting means therefor and having side and rear walls of high infra-red reflectivity, an external shell spaced from said shelf-supporting housing and provided with upper and lower openings for air circulation, said housing being provided with corresponding upper and lower openings for accommodating free air movement about said means and shelf, the combined effect of the transparency of said shelf to infra-red radiation and the cooling of said shelf by the air being such as to be adapted to maintain said shelf at a temperature below that which would scorch material placed on the shelf, said housing comprising upper and lower and side and rear pan-shaped walls in unitary assembly, the side and rear pan-shaped walls having outwardly directed flanges and the upper and lower pan-shaped walls having inwardly directed flanges, the last mentioned walls having apertures and said housing being provided with sockets registering with said apertures, the said infra-red bulbs being mounted in the said sockets and projecting through the apertures to the interior of the housing.

8. In a device of the character described, the subcombination which comprises a frameless interior oven housing including in unitary assembly pan-shaped side and rear walls having outwardly projecting flanges and pan-shaped top and bottom walls connected with the rear and side walls for maintaining them in assembly independently of any frame, said housing being provided at a point intermediate its height with brackets connected with the side walls, and a shelf of a material substantially transparent to infra-red radiation mounted on said brackets, an exterior shell, bolts connecting the rear wall of the housing with the rear wall of the shell, spacers for holding the housing in spaced relation to all portions of the shell, the shell having air-circulating ports above and below the housing and being provided with a door, the front of the housing being open opposite the door.

9. The device of claim 8 in which the top and bottom of the housing have inwardly directed flanges and central apertures, the shell being provided with lamp supports and lamps in the respective supports and having neck portions disposed in the apertures, each lamp having a portion for infra-red radiation disposed within the housing.

(References on following page)

References Cited in the file of this patent

UNITED STATES PATENTS

| | | |
|---|---|---|
| 1,815,312 | Heise | July 21, 1931 |
| 1,969,614 | Klopfenstein | Aug. 7, 1934 |
| 2,314,592 | McCormick | Mar. 23, 1943 |
| 2,340,354 | Wells | Feb. 1, 1944 |
| 2,378,950 | Reich | June 26, 1945 |
| 2,408,295 | Cossin | Sept. 24, 1946 |
| 2,419,643 | Hudson | Apr. 29, 1947 |
| 2,434,166 | Klumpp | Jan. 6, 1948 |
| 2,454,370 | Beaubien | Nov. 23, 1948 |
| 2,495,435 | Welch | Jan. 24, 1950 |
| 2,504,110 | Davis | Apr. 18, 1950 |
| 2,511,790 | Scofield | June 13, 1950 |
| 2,558,294 | Finizie | June 26, 1951 |
| 2,594,743 | Dietert et al. | Apr. 29, 1952 |
| 2,609,301 | Lindsey | Sept. 2, 1952 |
| 2,618,730 | Panken | Nov. 18, 1952 |
| 2,640,779 | George | June 2, 1953 |
| 2,668,364 | Colton | Feb. 9, 1954 |
| 2,767,297 | Benson | Oct. 16, 1956 |